United States Patent
Miyamoto et al.

(10) Patent No.: US 9,971,522 B2
(45) Date of Patent: May 15, 2018

(54) MEMORY SYSTEM AND METHOD

(71) Applicant: Toshiba Memory Corporation, Minato-ku (JP)

(72) Inventors: Yukimasa Miyamoto, Yokohama (JP); Koichi Nagai, Ota (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 473 days.

(21) Appl. No.: 14/636,444

(22) Filed: Mar. 3, 2015

(65) Prior Publication Data

US 2016/0018994 A1   Jan. 21, 2016

Related U.S. Application Data

(60) Provisional application No. 62/027,003, filed on Jul. 21, 2014.

(51) Int. Cl.
*G06F 3/06* (2006.01)
*G06F 1/32* (2006.01)

(52) U.S. Cl.
CPC .......... *G06F 3/0616* (2013.01); *G06F 1/3275* (2013.01); *G06F 3/0625* (2013.01); *G06F 3/0653* (2013.01); *G06F 3/0659* (2013.01); *G06F 3/0679* (2013.01); *Y02D 10/13* (2018.01); *Y02D 10/14* (2018.01); *Y02D 10/154* (2018.01)

(58) Field of Classification Search
CPC .... G06F 3/0616; G06F 3/0653; G06F 3/0679; G06F 3/0625; G06F 3/0659; G06F 1/3275

See application file for complete search history.

(56) References Cited

U.S. PATENT DOCUMENTS

| | | | |
|---|---|---|---|
| 8,935,465 B1* | 1/2015 | Shaharabany | G06F 12/0246 711/103 |
| 2003/0172229 A1 | 9/2003 | Takasugi et al. | |
| 2006/0184719 A1 | 8/2006 | Sinclair | |
| 2009/0292863 A1 | 11/2009 | Shiga et al. | |
| 2010/0174951 A1 | 7/2010 | Yamashita et al. | |
| 2013/0191609 A1* | 7/2013 | Kunimatsu | G06F 12/10 711/203 |

* cited by examiner

*Primary Examiner* — Reginald Bragdon
*Assistant Examiner* — Mehdi Namazi
(74) *Attorney, Agent, or Firm* — Oblon, McClelland, Maier & Neustadt, L.L.P.

(57) ABSTRACT

According to one embodiment, a memory system includes a nonvolatile memory and a controller. The controller reads write data associated with a first write command from a host memory by a unit of a first size in response to the first write command from a host. The host memory is included in the host. In a case where the size of first data not yet read from the host memory out of the write data is less than a second size, in response to a second write command, the controller reads second data of the second size and writes the read second data into the nonvolatile memory. The second data includes the first data and third data included in write data associated with the second write command. After writing the second data into the nonvolatile memory, the controller transmits a notice for the first write command to the host.

20 Claims, 5 Drawing Sheets

MEMORY SYSTEM AND METHOD

CROSS-REFERENCE TO RELATED APPLICATIONS

This application is based upon and claims the benefit of priority from U.S. Provisional Application No. 62/027,003, filed on Jul. 21, 2014; the entire contents of which are incorporated herein by reference.

FIELD

Embodiments described herein relate generally to a memory system and method.

BACKGROUND

Conventionally, memory systems having nonvolatile memories have been used as external storage devices for hosts. Among the nonvolatile memories, there are ones which have a limit to the endurance of rewrite times. Thus, for the purpose of extending the lifetime of the memory system, it is desired to perform data write as efficiently as possible.

DETAILED DESCRIPTION

In general, according to one embodiment, a memory system includes a nonvolatile memory and a controller. The controller reads write data associated with a first write command from a host memory by a unit of a first size in response to the first write command from a host. The host memory is included in the host. In a case where the size of first data not yet read from the host memory out of the write data is less than a second size, in response to a second write command, the controller reads second data of the second size from the host memory and writes the read second data into the nonvolatile memory. The second data includes the first data and third data. The third data is included in write data associated with the second write command. After writing the second data into the nonvolatile memory, the controller transmits a notice for the first write command to the host.

Exemplary embodiments of a memory system and method will be explained below in detail with reference to the accompanying drawings. The present invention is not limited to the following embodiments.

First Embodiment

Figure 1:
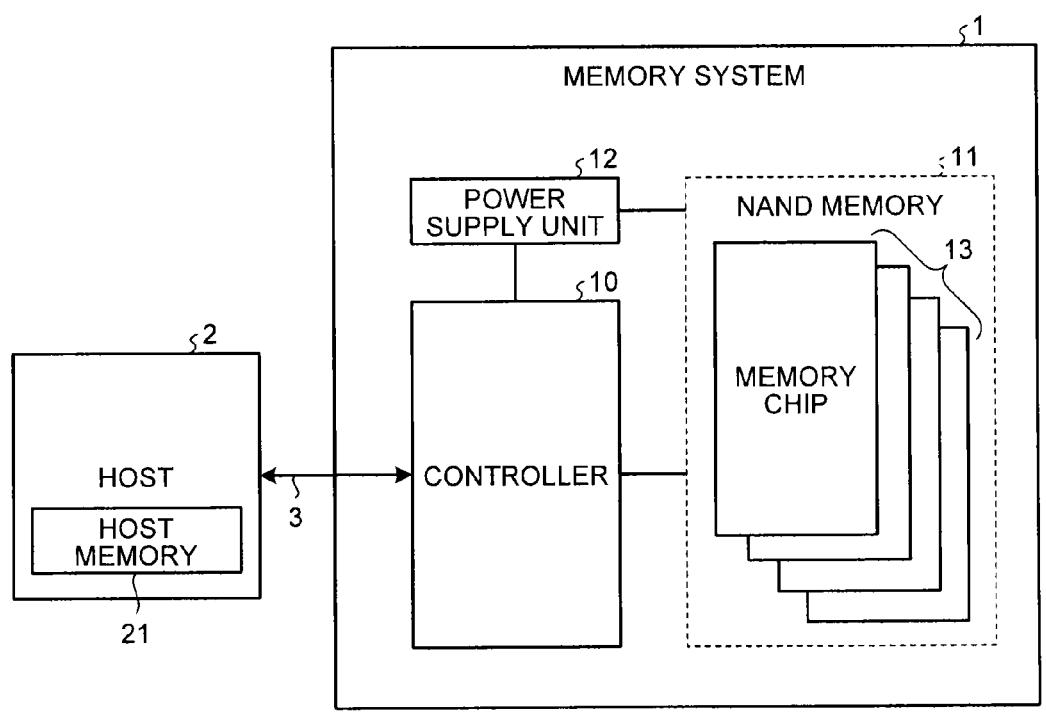
FIG. 1 is a block diagram showing an example of a memory system of a first embodiment.

FIG. 1 is a block diagram showing an example of a memory system of the first embodiment. The memory system 1 is connected via a communication path 3 to a host 2. The host 2 is, for example, a computer. The computer includes, for example, a server, a personal computer, a portable computer, or a portable communication terminal. The memory system 1 functions as an external storage device for the host 2.

The host 2 comprises a host memory 21. The host 2 sequentially generates various commands for the memory system 1 in the host memory 21. The commands which the host 2 generates include write commands and read commands. The write command and the read command include a logical address specifying a location to store data at or a data storing location. The write command requests the memory system 1 to write data. Data which the write command requests to write is referred to as write data. The write data corresponds to a write command one on one. The read command requests the memory system 1 to read out data from its memory.

Figure 2:
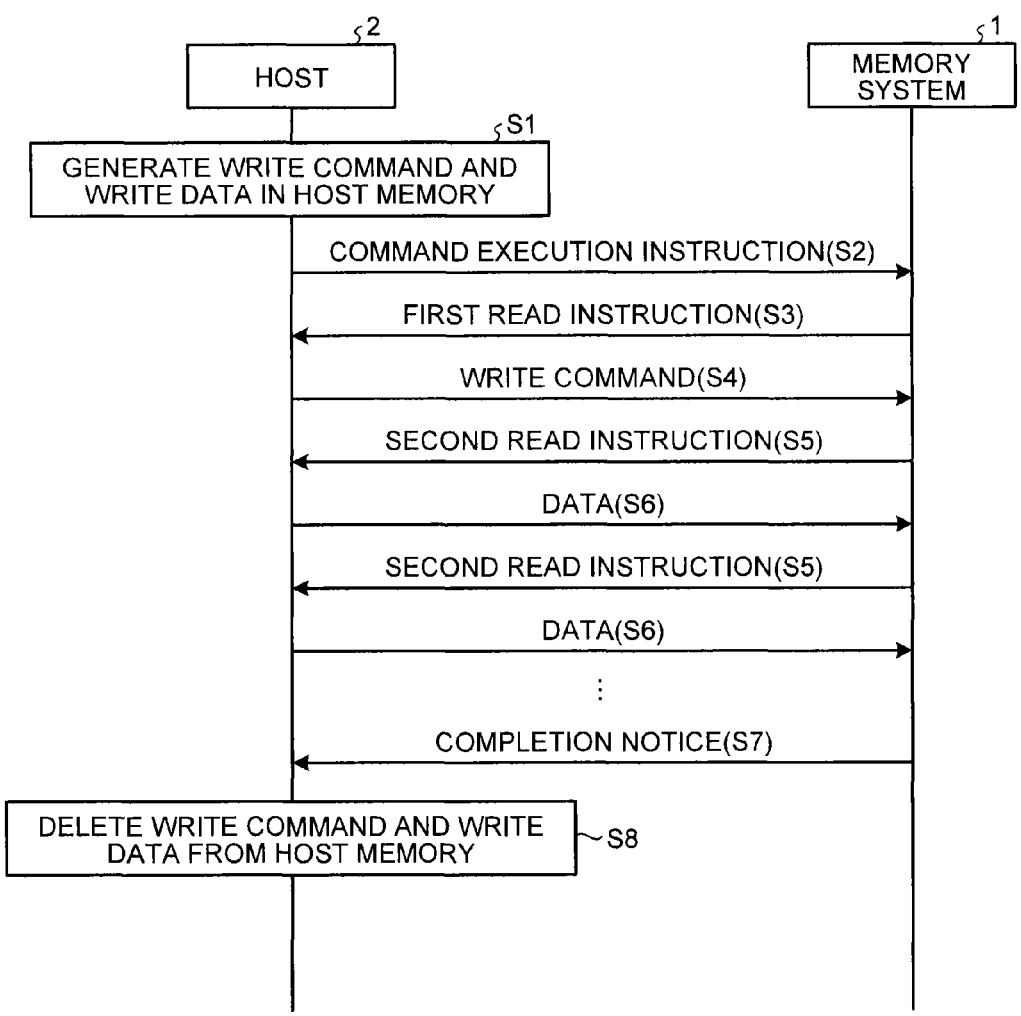
FIG. 2 is a diagram for explaining information transmission and reception when a write command is executed.

The memory system 1 transmits a read instruction to the host 2, thereby acquiring various commands and write data. An example of information transmission and reception between the memory system 1 and the host 2 will be described. FIG. 2 is a diagram for explaining information transmission and reception when a write command is executed. First, the host 2 generates the write command and write data in the host memory 21 (S1). The host 2 transmits a command execution instruction to the memory system 1 (S2). The command execution instruction is information indicating that a write command has been generated.

When receiving the command execution instruction, the memory system 1 transmits a first read instruction to read the command from the host memory 21 to the host 2 (S3). The first read instruction includes information specifying the location at which the generated write command is stored in the host memory 21. When receiving the first read instruction, the host 2 reads the write command from the host memory 21 and transmits the write command to the memory system 1 (S4). When receiving the write command, the memory system 1 parses the write command and realizes the write command. Then the memory system 1 transmits a second read instruction to read the write data to the host 2 (S5). When receiving the second read instruction, the host 2 reads the write data from the host memory 21 and transmits the write data to the memory system 1 (S6). Note that transfer between the memory system 1 and the host 2 is executed in first-size units. That is, if greater in size than the first size, the write data is divided into a plurality of data, and for each divided data, S5 and S6 are executed. The first size is determined by, e.g., the standard of the communication path 3 or the host 2. Data of the first size to be transferred via the communication path 3 is referred to as first-unit data. After finishing the execution of the write command, the memory system 1 transmits a completion notice to the host 2 (S7). The host 2 realizes the completion of the execution of the write command through the completion notice and deletes the write command and the write data from the host memory 21 (S8).

As the standard of the communication path 3, any standard can be adopted as long as various commands and write data can be transferred from the host 2 to the memory system 1 under the control of the memory system 1 according to that standard as described above. For example, PCI Express can be adopted as the standard of the communication path 3.

The memory system 1 comprises a controller 10, a NAND flash memory (NAND memory) 11 used as a storage, and a power supply unit 12. The type of memory used as a storage need only be a nonvolatile memory, not being limited to a NAND flash memory. For example, a NOR flash memory, ReRAM (Resistance Random Access Memory), MRAM (Magnetoresistive Random Access Memory), or the like can be adopted.

The NAND memory 11 is formed of one or more memory chips 13 having a memory cell array. The memory cell array is formed of multiple memory cells arranged in a matrix. The individual memory cell array is formed of multiple blocks arranged, the block being the unit for erasing. Each block consists of multiple pages, the page being the unit of reading and writing performed for the memory cell array.

The power supply unit 12 supplies power to the controller 10 and the NAND memory 11.

The controller 10 controls the NAND memory 11 according to commands acquired from the host 2.

Figure 3:
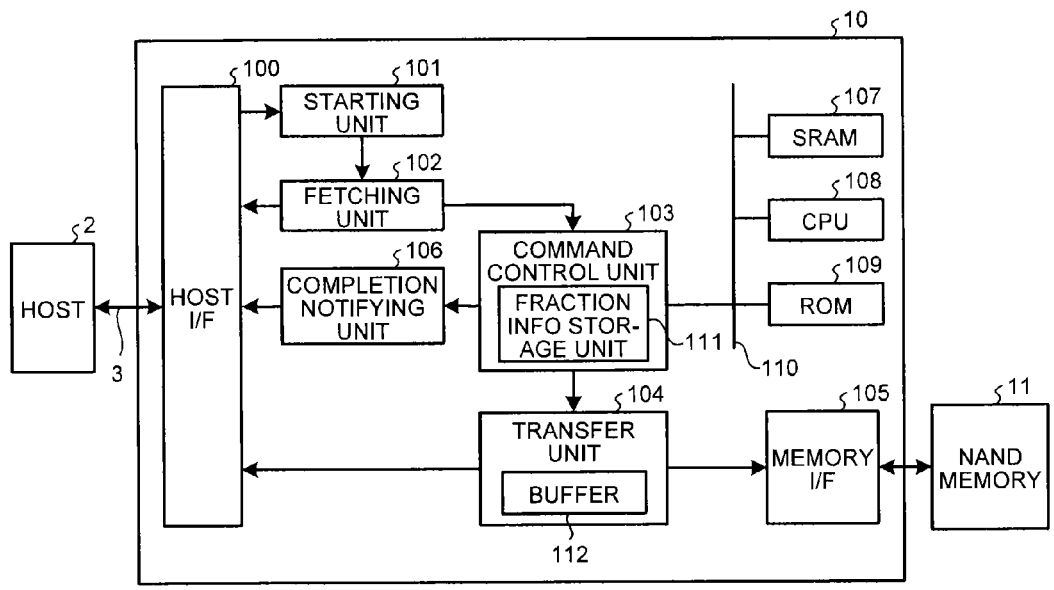
FIG. 3 is a block diagram showing an example of the controller of the first embodiment.

FIG. 3 is a block diagram showing an example of the controller 10 of the first embodiment. The controller 10 comprises a host interface (I/F) 100, a starting unit 101, a fetching unit 102, a command control unit 103, a transfer unit 104, a memory I/F 105, and a completion notifying unit 106. The controller 10 further comprises an SRAM (Static Random Access Memory) 107, a CPU (Central Processing Unit) 108, a ROM (Read Only Memory) 109, and a bus 110. The SRAM 107, CPU 108, and ROM 109 are connected to each other via the bus 110.

The host I/F 100 is an interface unit for the controller 10 connecting to the host 2. The memory I/F 105 is an interface unit for the controller 10 connecting to the NAND memory 11. The starting unit 101 receives a command execution instruction from the host 2 via the host I/F 100. When receiving a command execution instruction, the starting unit 101 instructs the fetching unit 102 to acquire a command. When instructed to acquire a command, the fetching unit 102 generates the first read instruction and transmits the generated first read instruction via the host I/F 100 to the host 2. Further, the fetching unit 102 receives the command transmitted from the host 2 in response to the first read instruction via the host I/F 100. The fetching unit 102 transmits the received command to the command control unit 103.

The command control unit 103 interprets the command received from the fetching unit 102. If the command received from the fetching unit 102 is a write command or a read command, then the command control unit 103 instructs the transfer unit 104 to perform data transfer between the host memory 21 and the NAND memory 11.

The transfer unit 104 performs the data transfer that the command control unit 103 has instructed it to do. The transfer unit 104 performs the data transfer via the host I/F 100 and the memory I/F 105. The transfer unit 104 comprises a buffer 112 for data transfer.

In the case of a write command, the transfer unit 104 generates the second read instruction to acquire data from the host memory 21. The transfer unit 104 transmits the generated second read instruction via the host I/F 100 to the host 2. The transfer unit 104 partitions write data from the host memory 21 into one or more first-unit data and sequentially acquires the first-unit data to sequentially store the acquired first-unit data in the buffer 112. The transfer unit 104 combines a plurality of first-unit data stored in the buffer 112 into data of a second size to transfer to the NAND memory 11. Data of the second size to be transferred to the NAND memory 11 is referred to as second-unit data. The second size is equal to, e.g., the size of the pages forming a memory cell array of the NAND memory 11. Where multiple pages form one logical page, the second size may be equal to the size of the logical page.

The store location in the host memory 21 for each data of the first size can be computed based on the beginning store location for the write data, the size of the write data, and the number of first-unit data already transferred. The beginning store location of the write data and the size of the write data are included in, e.g., the write command. For example, the transfer unit 104 computes the store location in the host memory 21 for each data of the first size. Or the command control unit 103 may compute the store location in the host memory 21 for each data of the first size and notify to the transfer unit 104.

The store location in the NAND memory 11 for each combined data is specified by the logical address included in the write command. At the time of data transfer, the logical address is translated into a physical address and then used. For example, translation between a logical address and a physical address is executed by the CPU 108.

Figure 4:
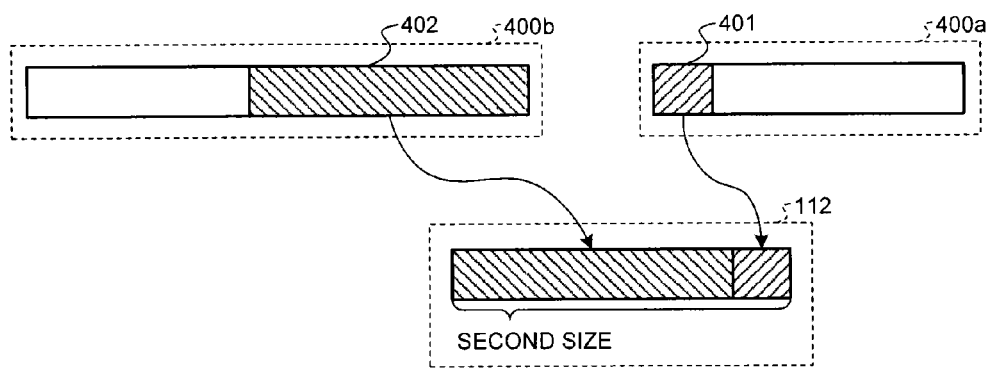
FIG. 4 is a diagram showing an example configuration of second-unit data.

Note that the combined data can be formed of a plurality of write data that different write commands have requested to write respectively. FIG. 4 is a diagram showing an example configuration of the second-unit data. Where, as shown in the figure, after one write data 400a is read on a second-size basis, data 401 of a size less than the second size remains, the data 401 is combined with part or all of write data 400b that a write command, issued next to the write command which has requested to write the write data 400a, has requested to write so as to produce data of the second size. Here, the data 401 is combined with data 402, part of the write data 400b, to produce combined data of the second size. Note that the data 401 and the data 402 are each divided into one or more first-unit data, which are transferred and combined in the buffer 112.

When executing a write command, the command control unit 103 determines whether combined data can be formed only of data not yet acquired from the host 2 out of write data associated with one or more write commands. If determining that combined data cannot be formed only of data not yet acquired from the host 2, the command control unit 103 stops acquiring not-yet acquired data until combined data comes to be able to be formed only of not-yet acquired data. When another write command is issued, so that new write data of a size exceeding the size of the shortfall is prepared, combined data comes to be able to be formed only of not-yet acquired data.

For example, if only the data 401 is not yet acquired, acquiring the data 401 is not started, so that the buffer 112 is maintained empty. Then, after the write data 400b is created, the data 401 and the data 402 are continuously acquired, and the acquired data 401 and data 402 form second-unit data in the buffer 112.

The command control unit 103 comprises a fraction information storage unit 111 that stores fraction information. The fraction information storage unit 111 is constituted by, e.g., a register or a small-scale memory. The fraction information indicates at least whether the current state is the state of stopping acquiring not-yet acquired data (a pending state).

In the case of a read command, the transfer unit 104 acquires data of the second size from the NAND memory 11 and stores the acquired data in the buffer 112. The transfer unit 104 divides the data of the second size stored in the buffer 112 into a plurality of first-unit data to sequentially transmit to the host 2. The host 2 stores each first-unit data transmitted from the transfer unit 104 into the host memory 21 by means of internal processing of the host 2.

The command control unit 103 monitors data transfer by the transfer unit 104. The command control unit 103 has the completion notifying unit 106 issue a completion notice each time data transfer according to a write command or a read command finishes. The completion notice is transmitted via the host I/F 100 to the host 2. The completion notice is notified, for example, in the following way. That is, the completion notifying unit 106 writes a command completion status into the host memory 21. Then the completion notifying unit 106 generates an interruption to notify the CPU (not shown) incorporated in the host 2 of the completion of writing the command completion status. Each completion notice includes information to identify the command of which the execution is finished. The host 2 can identify the command of which the execution is finished based on the completion notice.

A firmware program is stored in the ROM 109 beforehand. The CPU 108 performs various processes by reading the firmware program from the ROM 109 to execute. The processes performed by the CPU 108 include, for example, translation between a logical address and a physical address, wear leveling, garbage collection, and management of the components (the host I/F 100, starting unit 101, fetching unit 102, command control unit 103, transfer unit 104, memory I/F 105, and completion notifying unit 106). The SRAM 107 provides a region to store management information to be used by the CPU 108. The management information includes, for example, a table that describes the correspondence relation between logical addresses and physical addresses.

Figure 5:
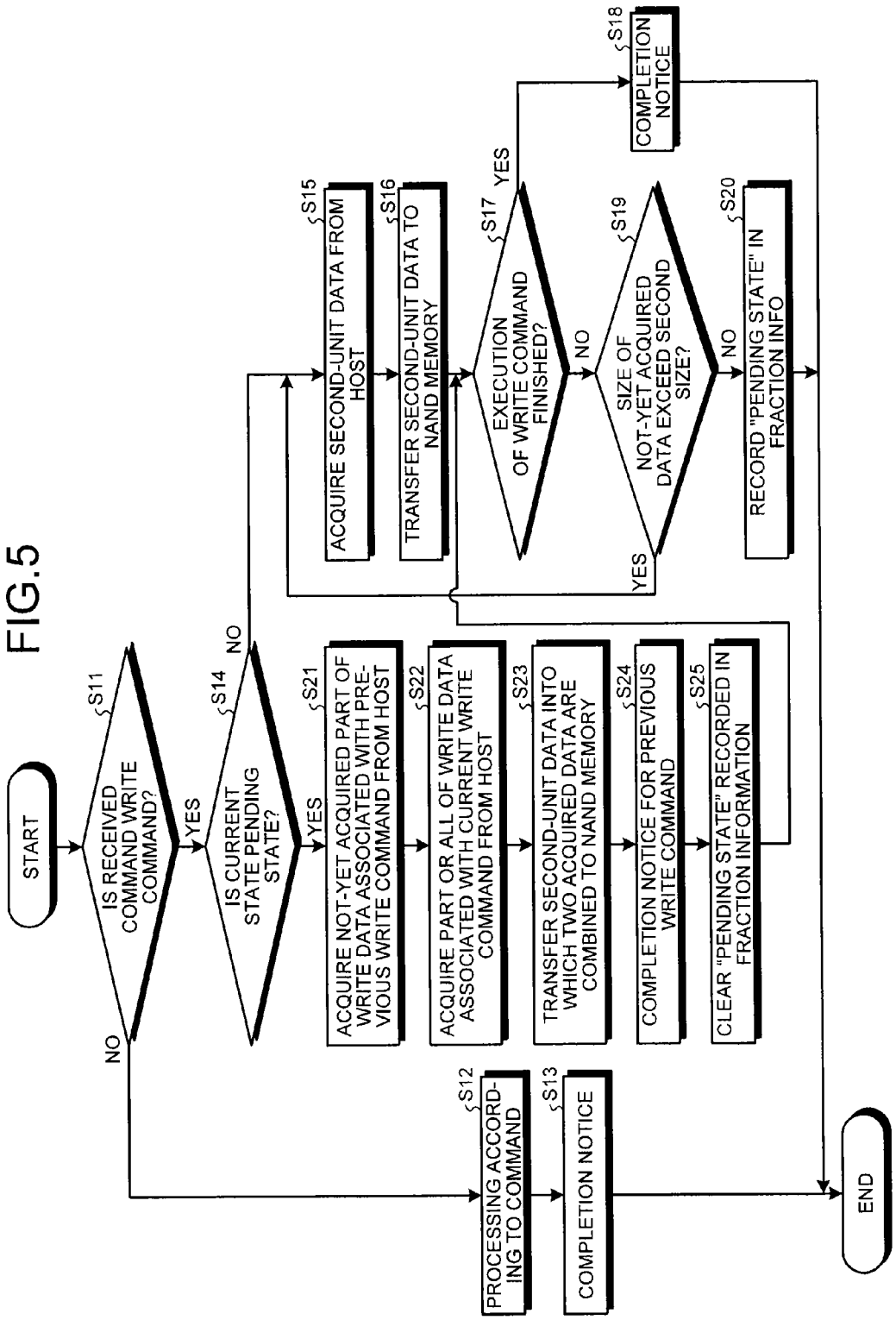
FIG. 5 is a flow chart for explaining the procedure of command processing.

FIG. 5 is a flow chart for explaining the procedure of command processing. The command control unit 103 interprets the command received from the fetching unit 102 and determines whether that command is a write command (S11). If the command is not a write command (No at S11), then the command control unit 103 performs processing according to that command (S12). After performing processing according to that command, the command control unit 103 has the completion notifying unit 106 issue a completion notice to the host 2 (S13) and finishes the operation.

If the command is a write command (Yes at S11), the command control unit 103, referring to the fraction information, determines whether the current state is a pending state (S14). If the current state is not a pending state (No at S14), the command control unit 103 has the transfer unit 104 acquire part or all of write data that is data of the second size from the host 2 (S15). The transfer unit 104 acquires the data of the second size in first-size units over a plurality of times.

Subsequently, the command control unit 103 has the transfer unit 104 transfer the acquired data of the second size to the NAND memory 11 (S16). Then the command control unit 103 determines whether the execution of the write command has finished (S17). In determination of S17, the command control unit 103 determines that the answer is yes if all of the write data associated with the write command has been transferred to the NAND memory 11 and that the answer is no if part of the write data associated with the write command has not yet been transferred.

If the execution of the write command has finished (Yes at S17), the command control unit 103 has the completion notifying unit 106 issue a completion notice to the host 2 (S18) and finishes the operation. If the execution of the write command has not finished (No at S17), the command control unit 103 determines whether the size of not-yet acquired part of the write data associated with the write command exceeds the second size (S19). The size of not-yet acquired part of the write data can be computed from the size of the write data and the number of already-acquired data of the first size. If the size of the not-yet acquired part is equal to or greater than the second size (Yes at S19), the command control unit 103 executes the process of S15 again. If the size of the not-yet acquired part is less than the second size (No at S19), the command control unit 103 records "the pending state" in the fraction information (S20) and finishes the operation.

On the other hand, in determination of S14, if determining that the current state is the pending state (Yes at S14), the command control unit 103 has the transfer unit 104 acquire not-yet acquired part of the write data associated with the previous write command (S21). The write command interpreted by the process of S11 is referred to as the current write command in contrast to the previous write command. The command control unit 103 has the transfer unit 104 acquire part or all of the write data associated with the current write command (S22). The command control unit 103 determines the size of data to be acquired at S22 such that the total of the size of data acquired by the process of S21 and the size of data to be acquired by the process of S22 coincides with the second size.

Subsequently, the command control unit 103 has the transfer unit 104 transfer data of the second size, formed of data acquired by the process of S21 and data acquired by the process of S22, to the NAND memory 11 (S23). Then the command control unit 103 has the completion notifying unit 106 issue a completion notice to the host 2 (S24). The completion notice issued at the process of S24 indicates that the execution of the previous write command has finished. After the process of S24, the command control unit 103 clears "the pending state" recorded in the fraction information (S25) and performs the determination of S17 for the current write command.

As such, according to the first embodiment, the controller 10 reads one write data on a second-unit data basis from the host memory 21 and writes one or more read second-unit data sequentially into the NAND memory 11. If the size of data that is part of the one write data and not yet acquired from the host memory 21 is less than the second size, then the controller 10 reads second-unit data into which the part of the write data and another write data are combined from the host memory 21. After having written the second-unit data into which the part of the write data and the other write data are combined, the controller 10 issues a completion notice for the one write data. The controller 10 always writes data on a second-unit data basis into the NAND memory 11, thus improving the efficiency of data writing.

Note that the other write data is data which the write command, issued next to the write command which requests to write the one write data, requests to write. If the size of the not-yet acquired data is less than the second size, the controller 10 waits for the issuing of the next write command to generate second-unit data, thus improving the efficiency of data writing.

Second Embodiment

In the pending state, the buffer 112 is empty. Therefore, even if the supply of power to the buffer 112 is cut off in the pending state, no data to be transferred to the NAND memory 11 is lost. In the second embodiment, the memory system 1, in the pending state, transitions the mode of power supply to a mode in which power consumption is smaller than usual.

Figure 6:
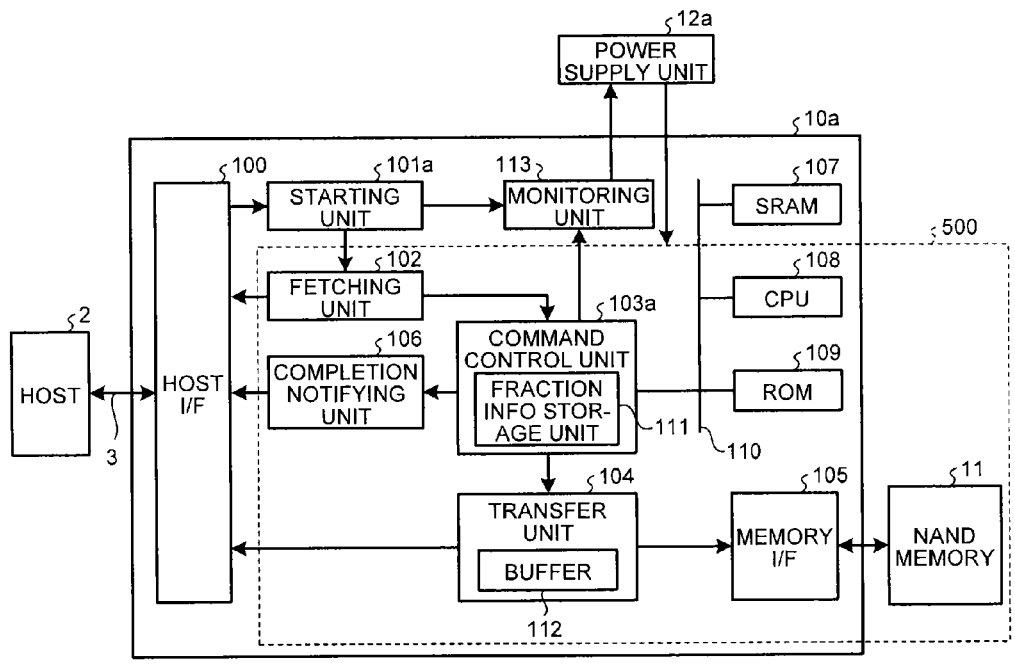
FIG. 6 is a block diagram showing an example of the controller of a second embodiment.

FIG. 6 is a block diagram showing an example of a controller incorporated in the memory system 1 of the second embodiment. In this embodiment, the same reference numerals and names are used to denote the same constituents as in the first embodiment, with duplicate description thereof being omitted. The power supply unit of the second embodiment is denoted by a reference numeral 12a to be distinguished from that of the first embodiment.

The controller 10a comprises the host I/F 100, a starting unit 101a, the fetching unit 102, a command control unit 103a, the transfer unit 104, the memory I/F 105, the completion notifying unit 106, and a monitoring unit 113. The controller 10a further comprises the SRAM 107, CPU 108, ROM 109, and bus 110. The SRAM 107, CPU 108, and ROM 109 are connected to each other via the bus 110.

The starting unit 101a has the same functions as the starting unit 101. Further, the starting unit 101a transmits an arrival notice to the effect that a command execution instruction has been received to the monitoring unit 113.

The command control unit 103a has the same functions as the command control unit 103. Further, in either of the case where the current state is the state in which, with the execution of a command having finished, the next command has not yet been received (a non-execution state) and the case where it is the pending state, the command control unit 103a transmits a suspended notice to the monitoring unit 113.

The power supply unit 12a operates in a plurality of modes. The plurality of modes include a normal mode and a low power consumption mode. The normal mode is a mode in which power is supplied to the constituents so as to be able to execute any command. In the normal mode, power is supplied to at least the buffer 112. Here, it is supposed that in the normal mode power is supplied to all the constituents that the controller 10a comprises and the NAND memory 11. The low power consumption mode is a mode smaller in power consumption than the normal mode and in which the supply of power to some of the constituents is stopped. The low power consumption mode is, for example, a mode in which the supply of power to at least the buffer 112 is stopped. Here, it is supposed that in the low power consumption mode power is not supplied to a constituent group 500. The constituent group 500 includes the fetching unit 102, command control unit 103a, transfer unit 104, memory I/F 105, completion notifying unit 106, CPU 108, ROM 109, bus 110 and NAND memory 11. In the low power consumption mode, power is supplied to the host I/F 100, starting unit 101a, and monitoring unit 113 so as to be able to capture command execution instructions from the host 2. Further, in the low power consumption mode, power is supplied also to the SRAM 107 so that the management information is not lost.

The monitoring unit 113 receives the suspended notice and the arrival notice. The monitoring unit 113 effects a transition of the mode of the power supply unit 12a at timings based on the suspended notice and the arrival notice.

Figure 7:
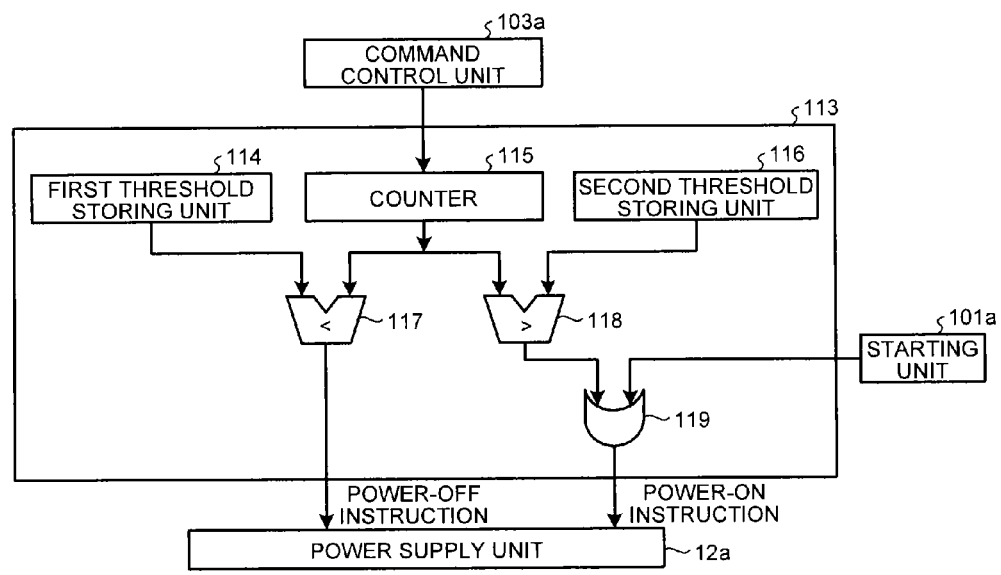
FIG. 7 is a block diagram showing an example of a monitoring unit.

FIG. 7 is a block diagram showing an example of the monitoring unit 113. The monitoring unit 113 comprises a first threshold storing unit 114, a counter 115, a second threshold storing unit 116, a comparator 117, a comparator 118, and an OR circuit 119.

The counter 115 receives the suspended notice from the command control unit 103a. The counter 115 counts the elapsed time from the start of receiving a suspended notice during the time that the suspended notice continues to be received. That is, the counter 115 counts the elapsed time from when the current state transitioned to the non-execution state or the pending state.

The first threshold storing unit 114 and the second threshold storing unit 116 are each constituted by a register or a small-scale memory. The first threshold storing unit 114 stores a first threshold, and the second threshold storing unit 116 stores a second threshold. The first threshold is smaller than the second threshold.

The comparator 117 compares the first threshold and the elapsed time counted by the counter 115. If the elapsed time is equal to or smaller than the first threshold, the comparator 117 outputs "0" and, if the elapsed time is greater than the first threshold, outputs "1" as a power-off instruction.

The comparator 118 compares the elapsed time and the second threshold. If the elapsed time is equal to or smaller than the second threshold, the comparator 118 outputs "0" and, if the elapsed time is greater than the second threshold, outputs "1". The OR circuit 119 performs an OR operation of the output of the comparator 118 and a start instruction from the starting unit 101a to output the result of the OR operation. For example, if "1" is input from the comparator 118 or if "1" is input as a start instruction from the starting unit 101a, the OR circuit 119 outputs "1" as a power-on instruction. If "1" is not input from the comparator 118, and "1" is not input from the starting unit 101a either, the OR circuit 119 outputs "0". That is, the power-on instruction is not output if the elapsed time is smaller than the second threshold, and a start instruction is not input, but is output if the elapsed time is greater than the second threshold, or if a start instruction is input.

The first threshold is set in the first threshold storing unit 114 by, e.g., a setting command from the host 2 or is set at a fixed value beforehand. Or the first threshold may be generated by the controller 10a converting a value specified by a setting command and be set. Likewise, the second threshold is set in the second threshold storing unit 116 by, e.g., a setting command from the host 2 or is set at a fixed value beforehand. Or the second threshold may be generated by the controller 10a converting a value specified by a setting command and be set. For example, where a time-out time is specified by a setting command, the specified time-out time or the value obtained by subtracting a predetermined value from the specified time-out time may be set as the second threshold.

When a power-off instruction has not been output, the power supply unit 12a switches its own mode from the normal mode to the low power consumption mode at the timing when a power-off instruction is output. Further, regardless of whether a power-off instruction has been output or not, the power supply unit 12a switches its own mode, if its own mode is the low power consumption mode, from the low power consumption mode to the normal mode at the timing when a power-on instruction is output.

Immediately before the mode of the power supply unit 12a transitions from the normal mode to the low power consumption mode, the command control unit 103a may save the fraction information stored in the fraction information storage unit 111 into a memory (e.g., the SRAM 107) to which power is supplied even in the low power consumption mode. Immediately after the mode of the power supply unit 12a transitions from the low power consumption mode to the normal mode, the command control unit 103a stores the saved fraction information into the fraction information storage unit 111.

When the mode has transitioned from the low power consumption mode to the normal mode because of a notice from the starting unit 101a, if the command having arrived is a write command, the command control unit 103a performs the processing of the write command according to the procedure of FIG. 5. Thereafter, if the conditions hold again, the mode of the power supply unit 12a transitions to the low power consumption mode. If the command having arrived is a command other than a write command, the command control unit 103*a* performs not a write operation but the processing of the arrived command, and thereafter if the conditions hold again, the mode of the power supply unit 12*a* transitions to the low power consumption mode.

If the count value of the counter 115 has reached the second threshold so that the mode of the power supply unit 12*a* transitions from the low power consumption mode to the normal mode, and "the pending state" is recorded in the fraction information, then the command control unit 103*a* has the transfer unit 104 perform data transfer without waiting for the next write command to be issued and, after the execution of the data transfer finishes, has the completion notifying unit 106 issue a completion notice. This is because the controller 10*a* issues a completion notice for the write command before the elapsed time reaches the time-out time. In this case, data of which the size is less than the second size is written into the NAND memory 11. Thereafter, if the conditions hold again, the mode of the power supply unit 12*a* transitions to the low power consumption mode.

As such, the monitoring unit 113, in the pending state, sets the mode of the power supply unit 12*a* to be the low power consumption mode until any subsequent command including a write command is issued. By this means, the controller 10*a* can improve the efficiency of writing data and also reduce power consumption.

The monitoring unit 113 waits for any subsequent command including a write command to be issued and, at the timing when the waiting time becomes greater than the first threshold, transitions the mode of the power supply unit 12*a* from the normal mode to the low power consumption mode. The monitoring unit 113, at the timing when the starting unit 101*a* detects the issuing of any command, transitions the mode of the power supply unit 12*a* from the low power consumption mode to the normal mode. Thus, the controller 10*a*, in the pending state, can transition the mode of the power supply unit 12*a* to the low power consumption mode.

Further, the monitoring unit 113 transitions the mode of the power supply unit 12*a* from the low power consumption mode to the normal mode at the timing when the waiting time becomes greater than the second threshold. By this means, if the time-out time is set in the command from the host 2, the controller 10*a* can return to the normal mode before the time-out time elapses from transitioning to the low power consumption mode.

The first threshold or the second threshold may be set by a setting command from the host 2. Thus, the controller 10*a* can operate in the low power consumption mode for a time according to the time-out time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system which is connectable to a host, comprising:
   a nonvolatile memory; and
   a controller that,
   in response to a first write command from the host, reads write data associated with the first write command from a host memory by a unit of a first size, the host memory being included in the host, and,
   in a case where a size of first data not yet read from the host memory out of the write data is less than a second size, in response to a second write command subsequent to the first write command, reads second data of the second size from the host memory, the second data including the first data and third data, the third data being included in write data associated with the second write command, writes the read second data into the nonvolatile memory and, after writing the second data into the nonvolatile memory, transmits a notice for the first write command to the host.

2. The memory system according to claim 1, wherein in a case where the size of the first data is equal to the second size, the controller reads the first data from the host memory to write the read first data into the nonvolatile memory and, after writing the first data into the nonvolatile memory, transmits the notice to the host.

3. The memory system according to claim 2, further comprising a power supply unit that operates in a first mode or in a second mode smaller in power consumption than the first mode,
   wherein the controller comprises:
   a starting unit that detects a command transmitted from the host;
   an execution unit that includes a buffer, acquires the command detected by the starting unit, and transfers data corresponding to the acquired command from the host memory to the nonvolatile memory via the buffer; and
   a monitoring unit that transitions the mode of the power supply unit,
   wherein in a case where the size of the first data is less than the second size, the monitoring unit sets the mode of the power supply unit to be the second mode until the second write command is detected.

4. The memory system according to claim 3, wherein the first mode is a mode in which power is supplied to the starting unit, the execution unit, the monitoring unit, and the nonvolatile memory, and
   wherein the second mode is a mode in which the supply of power to the execution unit and the nonvolatile memory is stopped while power is supplied to the starting unit and the monitoring unit.

5. The memory system according to claim 3, wherein in a case where the size of the first data is less than the second size, and the elapsed time from when determining that the size of the first data is less than the second size exceeds a first threshold, the monitoring unit transitions the mode of the power supply unit from the first mode to the second mode and, when the starting unit detects the second write command, transitions the mode of the power supply unit from the second mode to the first mode.

6. The memory system according to claim 5, wherein in a case where the elapsed time exceeds a second threshold greater than the first threshold, the monitoring unit transitions the mode of the power supply unit from the second mode to the first mode.

7. The memory system according to claim 6, wherein the second threshold is set in the monitoring unit by a setting command from the host.

8. The memory system according to claim 5, wherein the first threshold is set in the monitoring unit by a setting command from the host.

9. The memory system according to claim 1, wherein the second size is the size of units in which to write data into the nonvolatile memory.

10. The memory system according to claim 1, wherein the controller transmits a read instruction to the host for reading data from the host memory.

11. A method of controlling a memory system including a nonvolatile memory and a power supply unit, comprising:
in response to a first write command from a host including a host memory, reading write data associated with the first write command from the host memory by a unit of a first size;
in a case where a size of first data not yet read from the host memory out of the write data is less than a second size, in response to a second write command subsequent to the first write command, reading second data of the second size from the host memory, the second data including the first data and third data, the third data being included in write data associated with the second write command, writing the read second data into the nonvolatile memory and, after writing the second data, transmitting a notice for the first write command to the host.

12. The method according to claim 11, comprising: in a case where the size of the first data is equal to the second size, reading the first data from the host memory to write the read first data into the nonvolatile memory and, after writing the first data, transmitting the notice to the host.

13. The method according to claim 12, comprising:
detecting a command transmitted from the host;
acquiring the detected command from the host to transfer data corresponding to the acquired command from the host memory to the nonvolatile memory;
transitioning the mode of the power supply unit between a first mode and a second mode smaller in power consumption than the first mode; and
in a case where the size of the first data is less than the second size, setting the mode to be the second mode until the second write command is detected.

14. The method according to claim 13, wherein the first mode is a mode in which power is supplied to at least a buffer to receive first data, and
wherein the second mode is a mode in which the supply of power to at least the buffer is stopped.

15. The method according to claim 13, comprising:
in a case where the size of the first data is less than the second size, and the elapsed time from when determining that the size of the first data is less than the second size exceeds a first threshold, transitioning the mode of the power supply unit from the first mode to the second mode; and
when detecting the second write command, transitioning the mode of the power supply unit from the second mode to the first mode.

16. The method according to claim 15, comprising: in a case where the elapsed time exceeds a second threshold greater than the first threshold, transitioning the mode of the power supply unit from the second mode to the first mode.

17. The method according to claim 16, comprising: accepting a setting command specifying the second threshold from the host.

18. The method according to claim 15, comprising: accepting a setting command specifying the first threshold from the host.

19. The method according to claim 11, wherein the second size is the size of units in which to write data into the nonvolatile memory.

20. The method according to claim 11, comprising: transmitting a read instruction to the host for reading data from the host memory.

* * * * *